US012776431B2

(12) United States Patent
D'Ippolito

(10) Patent No.: US 12,776,431 B2
(45) Date of Patent: Oct. 27, 2026

(54) SURGE ARRESTER INCLUDING A DISCONNECTOR AND RELATED EXTINGUISHING/DEIONIZATION CHAMBER

(71) Applicant: ZOTUP S.R.L., Bergamo (IT)

(72) Inventor: Gianfranco D'Ippolito, Bergamo (IT)

(73) Assignee: ZOTUP S.R.L., Bergamo (IT)

( * ) Notice: Subject to any disclaimer, the term of this patent is extended or adjusted under 35 U.S.C. 154(b) by 245 days.

(21) Appl. No.: 18/708,387

(22) PCT Filed: Oct. 25, 2022

(86) PCT No.: PCT/IB2022/060225
§ 371 (c)(1),
(2) Date: May 8, 2024

(87) PCT Pub. No.: WO2023/084346
PCT Pub. Date: May 19, 2023

(65) Prior Publication Data

US 2025/0014790 A1 Jan. 9, 2025

(30) Foreign Application Priority Data

Nov. 9, 2021 (IT) ........................ 102021000028448

(51) Int. Cl.
*H01C 7/12* (2006.01)
*H01H 37/76* (2006.01)
(Continued)

(52) U.S. Cl.
CPC ........... *H01C 7/126* (2013.01); *H01H 37/761* (2013.01); *H01T 1/02* (2013.01); *H01T 1/14* (2013.01); *H01H 2037/762* (2013.01)

(58) Field of Classification Search
CPC ........ H01C 7/126; H01C 7/12; H01H 37/761; H01H 2037/762; H01H 9/34; H01H 9/46; H01T 1/02; H01T 1/14
See application file for complete search history.

(56) References Cited

U.S. PATENT DOCUMENTS

2008/0186643 A1 8/2008 Domejean
2009/0213518 A1* 8/2009 Domejean .............. H01H 83/10 361/111
(Continued)

FOREIGN PATENT DOCUMENTS

EP 1953788 A1 * 8/2008 ............. H01H 83/10
EP 2790192 A1 * 10/2014 ........... H01H 37/761
(Continued)

OTHER PUBLICATIONS

Domejean, Eric; Grumel, Christophe, "Device for protecting against voltage surges with a mobile electrode with system for unlocking the disconnection device", Aug. 6, 2008, Schneider Electric Industries Sas, Entire Document (Translation of EP 1953788) (Year: 2008).*
(Continued)

*Primary Examiner* — Stephen S Sul
(74) *Attorney, Agent, or Firm* — NIXON & VANDERHYE

(57) ABSTRACT

A surge arrester comprises first and second electric terminals, between which a protection member is connected, provided with a voltage electrode and with a protective electrode equipped with respective electrical connectors electrically connected to the electric terminals. A disconnector comprises a metal lamina failing in the presence of short-circuit currents exceeding a preset threshold. An intercepting slider is mounted elastically biased and slides in a chamber crossed by the lamina. Displacement of the interception slider is prevented by the lamina and allowed by the
(Continued)

failing of the lamina. An arc extinguishing chamber has a divergent duct and a respective inlet portion defined by end portions of a pair of divergent conductors. The inlet portion is arranged in fluidic communication with the sliding and guiding chamber and has an opening facing a pressure wave front generated by the displacement of the interception slider acting as a plunger.

4 Claims, 4 Drawing Sheets

(51) Int. Cl.
*H01T 1/02* (2006.01)
*H01T 1/14* (2006.01)

(56) References Cited

U.S. PATENT DOCUMENTS

2011/0032651 A1* 2/2011 Depping .............. H01H 37/761 361/91.1
2013/0100558 A1* 4/2013 Crevenat ................... H01T 1/02 361/3
2013/0208388 A1 8/2013 Ehrhardt
2015/0171622 A1* 6/2015 Lee ........................ H01C 7/126 361/93.7
2016/0134104 A1* 5/2016 Mao ....................... H02H 9/044 361/124
2018/0211805 A1* 7/2018 D'Ippolito ................ H01T 1/14
2020/0036185 A1* 1/2020 Tsovilis ................... H02H 9/06

FOREIGN PATENT DOCUMENTS

EP 2827355 A1 1/2015
EP 3326180 A1 5/2018
EP 3232460 B1 * 10/2019 ............. H01H 71/22

OTHER PUBLICATIONS

International Search Report for PCT/IB2022/060225, mailed Feb. 13, 2023, 4 pages.
Written Opinion of the ISA for PCT/IB2022/060225, mailed Feb. 13, 2023, 7 pages.

* cited by examiner

SURGE ARRESTER INCLUDING A DISCONNECTOR AND RELATED EXTINGUISHING/DEIONIZATION CHAMBER

This application is the U.S. national phase of International Application No. PCT/IB2022/060225 filed Oct. 25, 2022, which designated the U.S. and claims priority to IT patent application No. 102021000028448 filed Nov. 9, 2021, the entire contents of each of which are hereby incorporated by reference.

FIELD OF THE INVENTION

The present invention relates to a surge arrester, also called a surge protector or more succinctly SPD (Surge Protective Device); in particular, it concerns a surge arrester equipped with a disconnector for opening the circuit at the end of the arrester's life

TECHNICAL BACKGROUND

The term surge arrester denotes those electrical/electronic devices which, interposed between an active conductor of an electrical installation and a ground protective conductor, provide for the discharge to earth of overcurrent/overvoltage peaks—such as those generated by atmospheric lightning strikes and switching operations—which could otherwise cause serious damage to the electrical installation and its equipment.

Direct lightning phenomena are in fact the main sources of disruptive effects on electrical installations and their user equipment; indirect discharges and switching surges are also sources of extensive damage, the origin of which is not easy to identify, but whose effects are just as dreadful for sensitive installations where continuity of operation is imperative.

The duration of these phenomena varies from a few microseconds to a few hundred microseconds, but in this very short time they contain a very high energy content. These phenomena must be appropriately intercepted and channeled to ground, in order to protect the equipment connected to the electrical network and thus guarantee the integrity and functionality of said network.

In this context, reference is made to arresters of the most recent known art, comprising a protective element in the form of a varistor, which has a behaviour equivalent to that of a variable (non-linear) resistor in the voltage/current ratio. When the reference voltage is exceeded, e.g. when a short-term overvoltage/overcurrent peak occurs, the varistor of the arrester abruptly lowers its resistance, so that the current peak can be easily discharged through it, to ground, and does not proceed to other parts of the electrical installation with higher resistance. Electrically connected to the varistor electrodes are the leads of the arrester connection terminals, which in turn are connected to a phase conductor and a protective conductor and/or neutral conductor respectively.

In the internal circuit of the arrester, in series with the protective element in the form of a varistor, there is typically also a 'disconnector', which constitutes a known disconnection device, with protective functions in case of failure and/or degradation of the protective element.

A thermal disconnector substantially consists of an electric conductor of various shapes, connected in series to the varistor electrode. This disconnector consists of a complex unit, typically comprising an elastic metal lamina attached to the varistor electrode by welding with a low-melting welding spot, i.e. capable of melting at a relatively low temperature (120-180° C.). The elastic lamina is welded in place and is elastically biased or spring-loaded, i.e. placed in an elastically charged condition that tends to distance it from the varistor electrode. Thanks to this arrangement, when the varistor begins to discharge, as a result of degradation, a significant current to ground, no longer transiently but continuously, the electrical conductor (i.e. the metal lamina) tends to heat up due to the Joule effect, transferring the temperature increase also to the welding spot: when the temperature of the low-melting alloy is reached, the retaining capacity of the welding spot ceases, releasing the metal lamina from constraint with the varistor electrode, thus opening the electrical circuit and restoring a safe condition.

Within certain short-circuit current values, typically a few tens of amperes, the disconnection system inside the arrester is then able to perform this disconnection effectively. It should be noted, however, that the disconnection achieved with the disconnector is not always sufficiently fast. In fact, it should be considered that when an electric circuit crossed by a high intensity electric current is opened, an electric arc tends to be established in an attempt to maintain the continuity of the circuit itself in the air. If the electric arc does not extinguish itself or the disconnector fails to interrupt it in a short time, a dangerous situation is created both in the arrester (overheating with possible fire and/or explosion) and in the associated electrical installation.

Typically, in the past, devices capable of interrupting significant short-circuit currents, of the order of kA rms, consisted of an overcurrent protection, e.g. a fuse or circuit breaker, placed in series with the arrester itself.

More recently, a very effective solution has been offered, described in EP 2790192 in the name of the same Applicant, which includes in a single device the disconnection capacity resulting from a slow degradation of the varistor, but also from an instantaneous degradation, e.g. an impulse overload, having a self-extinguishing capacity for major short-circuit currents that may be generated.

This system has been further refined with the solution proposed in EP 3326180 (as shown in FIG. 1).

Briefly, the arrester disclosed in these documents comprises a disconnector, which includes a crossing connector in the form of a flexible metal lamina with a geometry such that, under normal operating conditions, it retains an elastically biased intercepting slider; the latter represents a mobile carriage or mobile element with a suitable geometry to intercept and interrupt the electric arc that should occur when the circuit is opened; a preloaded spring is inserted in a longitudinal groove of the slider, suitable for supplying the thrust energy to the slider during its actuation, maintained in compression by the presence of the crossing connector, which acts as a constraint to the slider.

When short-circuit currents are established, the opening of the electric circuit occurs due to the fact that the metal lamina of the disconnector sublimates (due to the temperature increase), releasing the slider which, running under the elastic force of the spring, intercepts and interrupts any electric arcs that may occur.

The geometry of the slider has been refined to take into account the fact that the sublimation of the conductive lamina generates the undesirable effect of forming a conductive gas mass (plasma), which causes a dangerous increase in temperature and pressure.

The improved geometry of the slider allows operation in a sufficiently rapid manner so as to prevent the pressure and temperature from having explosive effects. However, it has been noted that above certain short-circuit current thresholds—typically above a few kA—the energy associated with the electric arc and the resulting plasma may be so high as to cause a destructive effect on the arrester.

To reduce the effects of the development of an electric arc, it has already been proposed to use, inside an arrester, a deionization/extinguishing chamber. However, the construction of the arrester is considerably complicated, because the presence of a deionization/extinguishing chamber requires a large installation space and mobile contacts with the relative kinematics that can accompany the arc, once formed, in the capture position at the entrance of the deionization/extinguishing chamber. Some examples of said devices are disclosed in EP1953787, EP2827355 and US2008/0186643.

SUMMARY OF THE INVENTION

The problem underlying the invention is therefore to supply a surge arrester with a disconnector that overcome the limits of the prior art; in particular, it is desired to provide an arrester with a disconnector as proposed in EP 2790192 or EP 3326180 that is able to withstand, without destructive effects, short-circuit currents even greater than a few dozen effective kA.

This object is achieved through the features set out in essential terms in the appended claims.

In particular, according to a first aspect of the invention, it is provided a surge arrester, comprising

- a first and a second electric terminals for connection to live and guard/neutral conductors of an electric system, between which a protection member is connected, provided with a voltage electrode and with a protective electrode equipped with respective electrical connectors electrically connected to said electric terminals,
- a disconnector electrically arranged between said protection member and said second electric terminal comprising a metal lamina failing in the presence of short-circuit currents exceeding a preset threshold, said failing generating plasma, and
- an intercepting slider, mounted elastically biased and sliding in a sliding and guiding chamber crossed by said lamina, displacement of said interception slider being prevented by said lamina and being allowed by the failing of said lamina,
- and further comprising an arc extinguishing chamber provided with a divergent duct and a respective inlet portion defined by end portions of a pair of divergent conductors, characterised in that
- said inlet portion is arranged in fluidic communication with said sliding and guiding chamber and has an opening facing a pressure wave front generated by said displacement of the interception slider acting as a plunger.

According to a preferred aspect, said protection electrode has a first electric contact and a second electric contact arranged in a respective hosting chamber of the protection device, and wherein said lamina is joined to said first electric contact and runs through an opening between a hosting chamber of the protection device and said sliding and guiding chamber.

Preferably, said extinguishing chamber comprises a divergent conductor electrically connected to said second electric contact at the same electric potential of said first electric contact.

According to another aspect, said first and second electric contacts are distinct and arranged adjacent and said opening of the inlet portion is arranged in the proximity of said first electric contact.

BRIEF DESCRIPTION OF THE DRAWINGS

Further features and advantages of the invention will, however, become more evident from the following detailed description of a preferred embodiment, given purely by way of a non-limiting example, and illustrated in the accompanying drawings, in which.

DETAILED DESCRIPTION OF A PREFERRED EMBODIMENT

Figure 1:
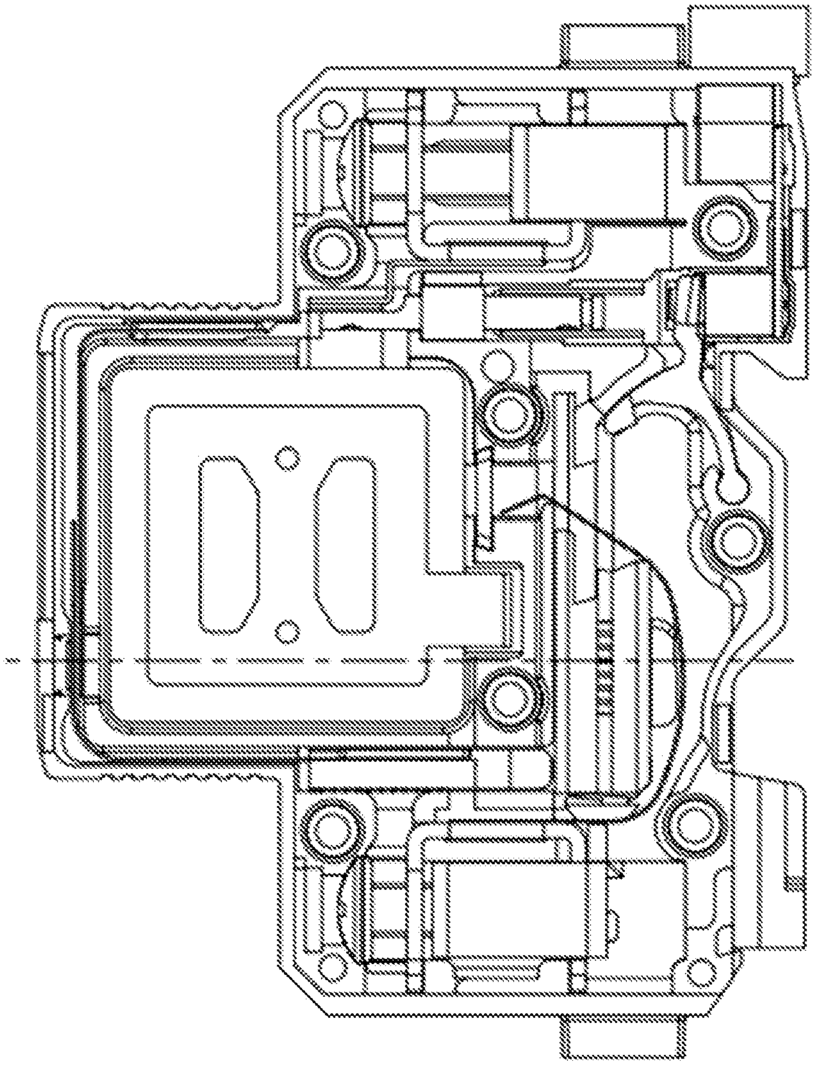
Fig. 1 Prior art
FIG. 1, as previously mentioned, is a schematic side elevation view, with parts removed, of an arrester structure of the prior art.

FIG. 1 shows a configuration of an arrester known per se from EP 3326180, which here can be considered to be included as a reference.

An arrester is housed in a box-shaped body or housing C, with such a size that it can be installed in a single standard module and wired within an electrical installation cabinet.

In this housing C, two opposing terminals are housed in a manner known per se—a first terminal 1 for connecting the phase conductor and a second terminal 2 for connecting the protective or neutral conductor—between which is arranged a protection element (typically a varistor), here schematised by a plate 3, being accommodated in a respective hosting chamber and including phase and protective conductor electrodes (not visible in the figures).

A first phase electrode is electrically connected to the phase terminal 1 by means of an extension conductor 1*a* (shown in the figures in the form of a conductive strip, but also able to be embodied in the form of a conductor cable), while the opposed protective electrode projects from the varistor with an electrical contact 3*a* that is connected to the ground or neutral terminal 2 by means of a discharge conductor also constituting part of the disconnector.

According to the teaching provided by EP 2790192—here included as a reference—the discharge conductor is arranged so as to fail in the presence of short-circuit currents above a preset threshold: its failure (which takes place in particular by sublimation), on the one hand, causes the disconnection or opening of the arrester circuit and, on the other hand, releases the movement of an elastically biased member that serves to interrupt any electric arc that may be formed.

Specifically, this discharge conductor of the disconnector is in the form of a flexible lamina 4 joined to the electrical contact 3*a* of the protective electrode by means of an appropriate low-melting welding spot at the point marked 4*a*. At the end opposite the welding spot 4*a*, the flexible lamina 4 is also electrically connected with an extension conductor 5 which runs in an appropriate position inside the container C and is joined to the ground terminal 2.

The material used to perform the low-melting weld and the exact configuration of the flexible lamina 4 is not relevant in this context and will not be described here in further detail; reference is hereby made to EP 2790192 for more information.

The flexible lamina 4 is preferably made to have a low thickness (in the order of a few tenths of a millimetre, for example 0.2-0.3 mm) and a reduced cross-section, with a metallic material having conductive properties equal to or lower than that of copper. Therefore, the lamina 4 is arranged to sublimate rapidly—i.e. to switch from the solid to the gaseous state—when run through by short-circuit currents exceeding a preset amount of current, in the order of a few kA rms for example starting from 3 kA. In essence, the lamina 4 has the function of a fuse and of a mechanical trigger in the presence of short-circuit currents (typically when the varistor fails). In addition, between the rigid retaining wall of the lamina 4 and an inner hosting chamber for hosting the varistor 3 and its electrical contact 3*a*, a guiding and sliding chamber is defined for an intercepting and compressing slider 6. In particular, the slider 6 is longitudinally guided by two parallel containment walls and has a shaped front face adapted to engage with an opposite shaped wall 6' of the chamber therefor.

A side guide wall of the slider 6 has a passage opening 7 through which the lamina 4 passes in order to be joined to the electrical contact 3*a*. The passage opening 7 therefore creates fluid communication from a hosting chamber of the electrical contact 3*a* of the arrester (i.e. the varistor 3) to the guiding and sliding chamber of the slider 6.

Figure 2A:
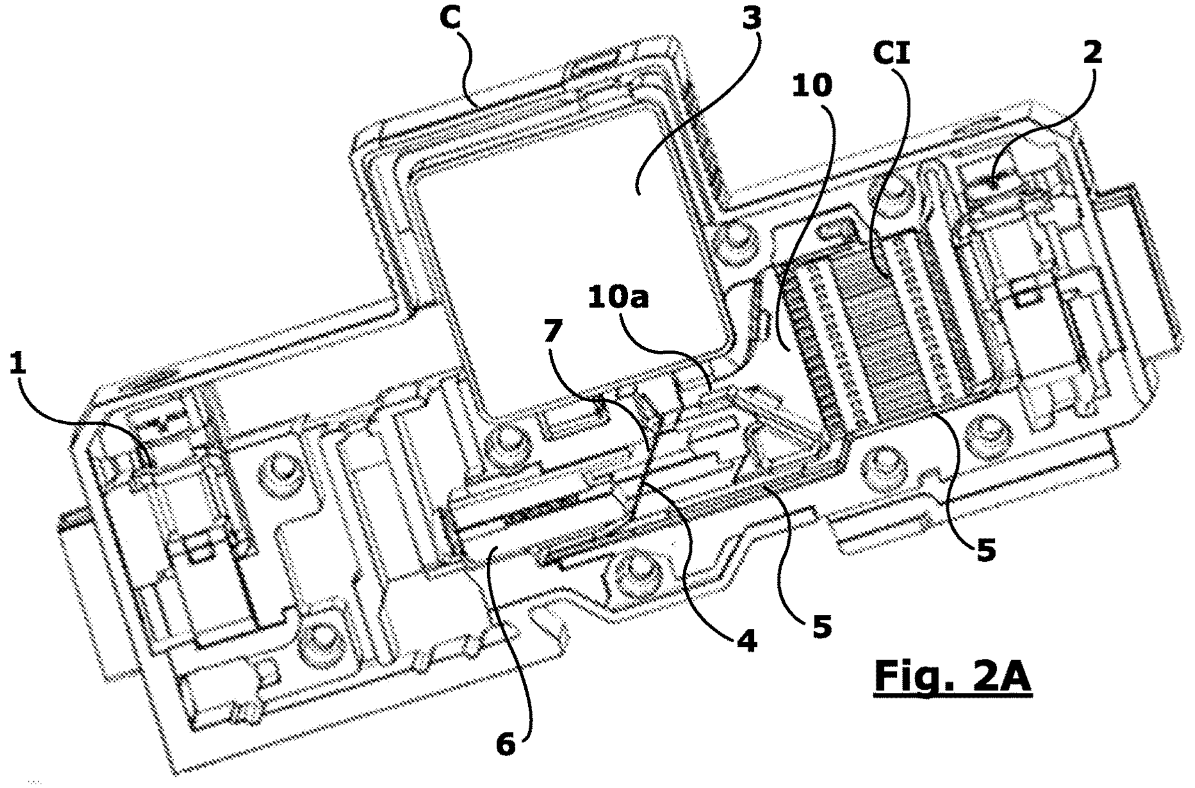
FIG. 2A is a perspective view, with parts removed, of the arrester according to the present invention.
Figure 2B:
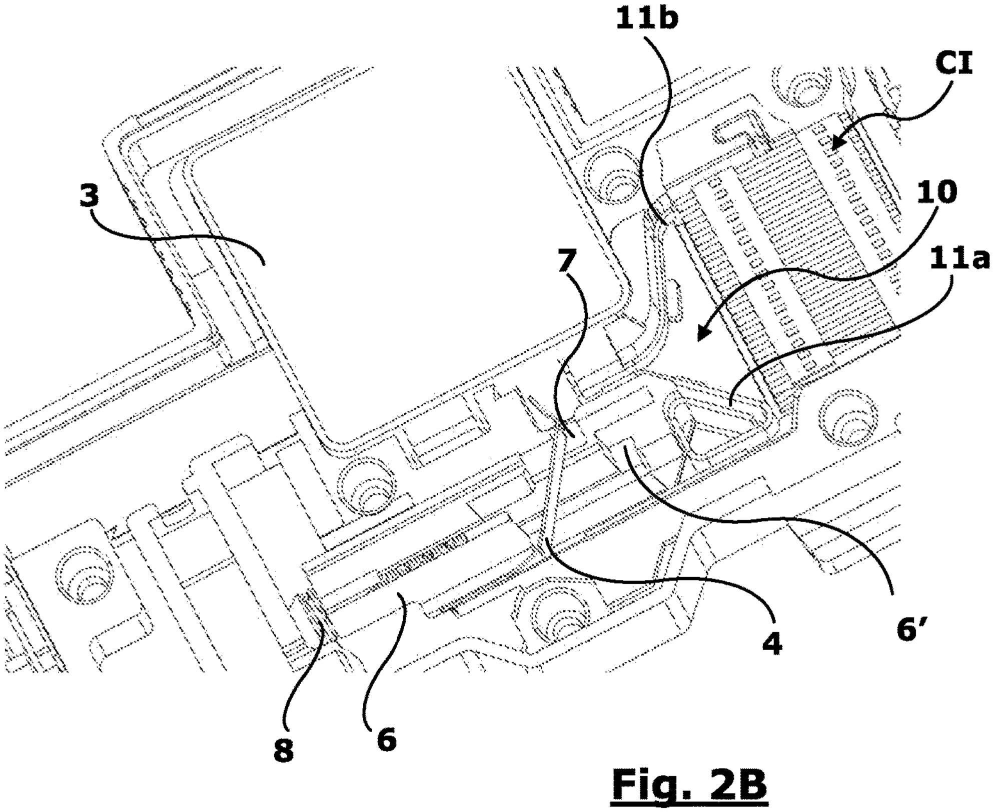
FIG. 2B is a sectional view of a detail of FIG. 2A.
Figure 3A:
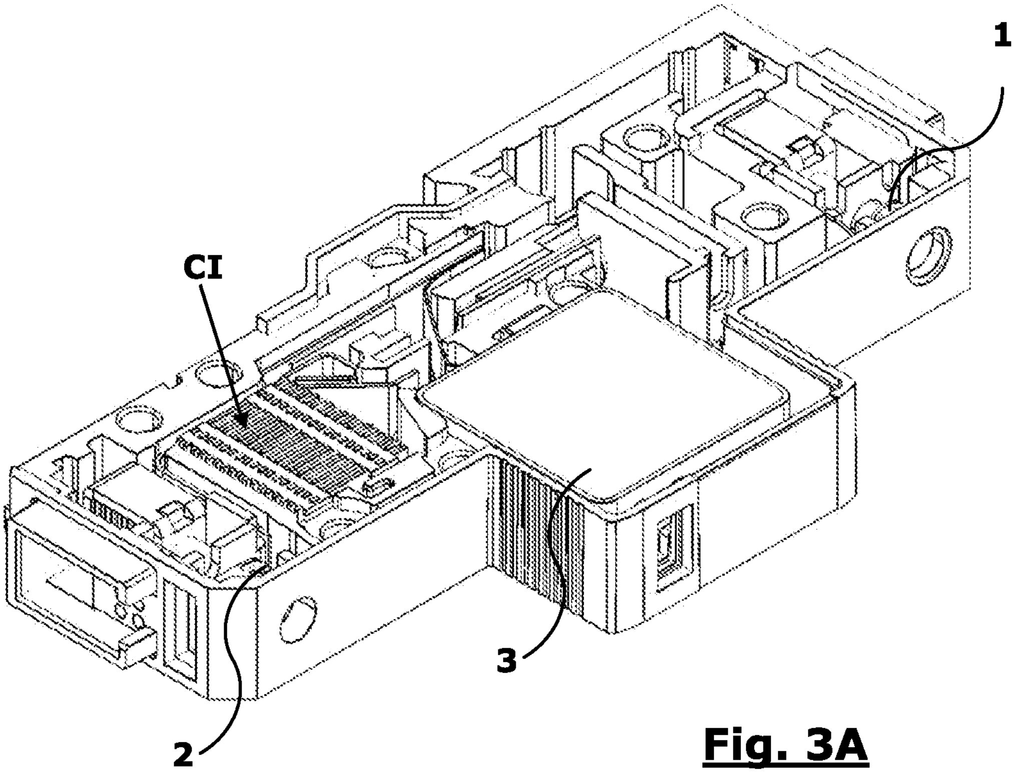
FIG. 3A is a view according to another perspective of the arrester of FIG. 2.
Figure 3B:
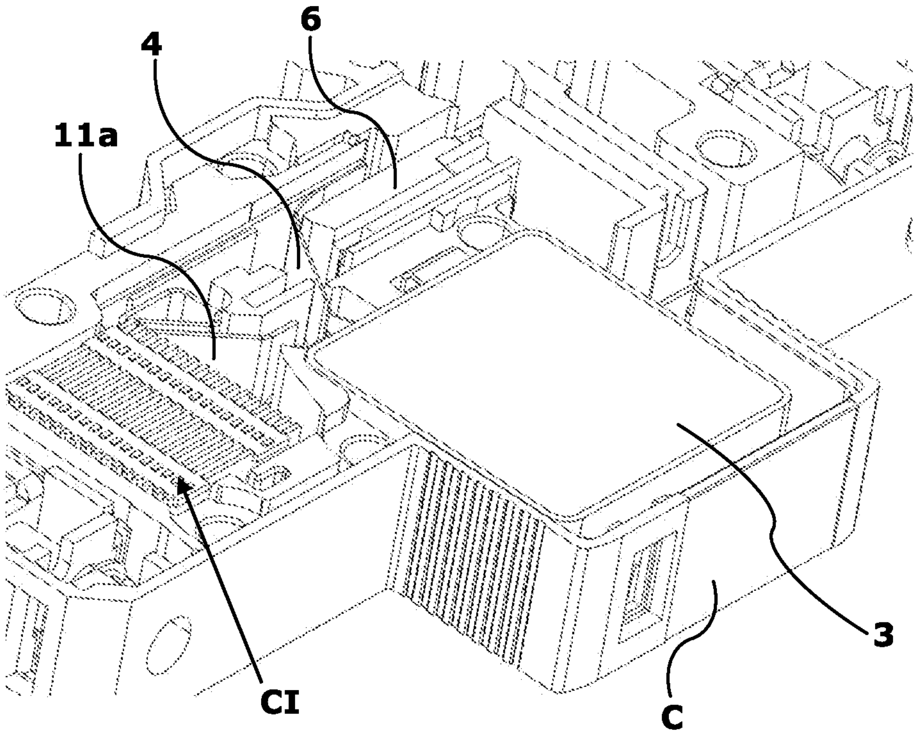
FIG. 3B is an enlarged view of a detail from FIG. 3A.
Figure 4:
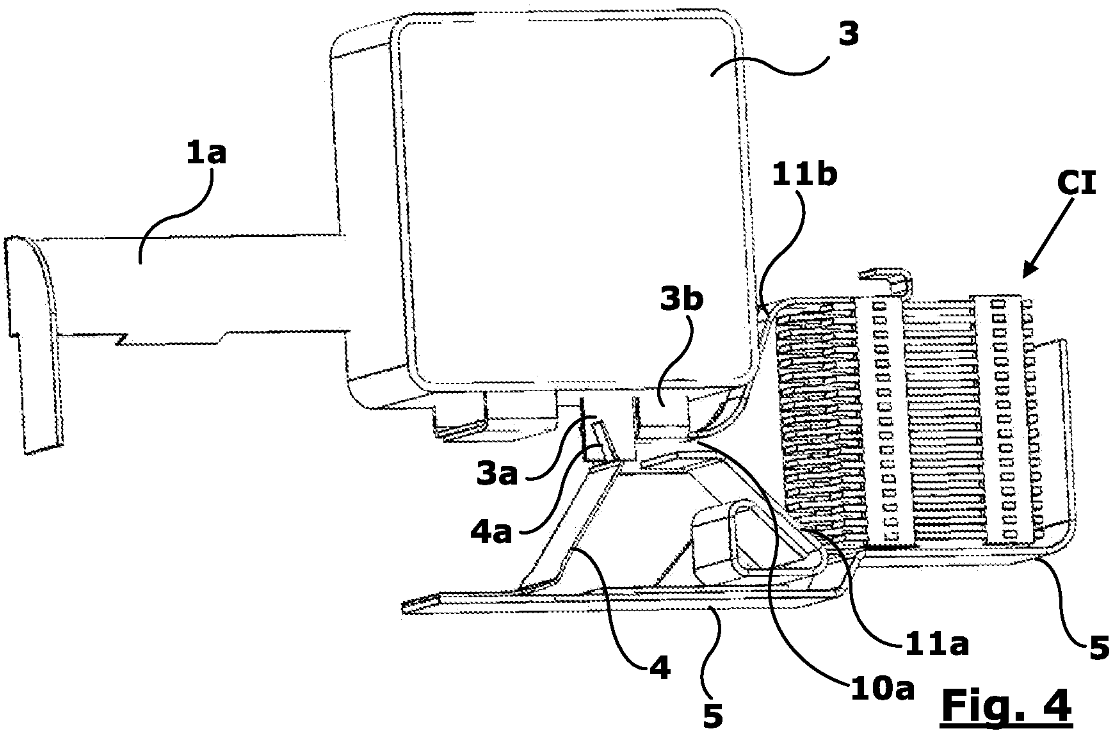
FIG. 4 is a perspective view of a varistor and an extinguishing chamber of the arrester of FIG. 1.

The slider 6 is mounted to slide longitudinally while being constrained, in rest conditions (as shown in FIGS. 2A and 2B), on one side against a bottom wall of the guiding and sliding chamber and, on the other side, on a part of the flexible lamina 4. The slider 6 is mounted biased in the direction of the lamina 4 by an elastic element, such as a spring 8, which is pre-stressed between the back wall and the slider body 6.

With this construction, the slider 6 is retained in the rest position by the lamina 4. Instead, when the lamina 4 fails (because it sublimates or because it melts the low-melting welding spot 4*a*) the retaining action of the lamina 4 ceases and the slider 6 is released and, pushed by the spring 8, performs a movement in the direction of the shaped wall 6'. As well explained in EP 2790192, the slider 6 performs an efficient electric arc extinguishing function that is created at the time of the sublimation of the lamina 4. In its movement, the slider 6 also compresses the volume where the lamina 4 is accommodated and causes the plasma in this branch of the circuit to be extinguished if it is formed by the gaseous conductive materials produced during the short-circuiting and sublimation of the lamina 4.

When the short-circuit current is particularly high, the intervention of the slider 6 alone may be insufficient to bring about a rapid extinguishing of the plasma developed within the device.

According to the invention, this problem is solved by providing inside the housing C a de-ionization or extinguishing chamber CI. In particular, the deionization or extinguishing chamber CI has a respective divergent conduit 10 which has an inlet 10*a* placed near the welding spot 4*a*, i.e. in communication with the hosting chamber of the electrical contact 3*a* of the varistor protection electrode 3.

What is most relevant for the teaching provided herein is that the inlet section 10*a* has an opening facing a pressure wave front that is determined by the movement of the slider 6. In other words, the displacement of the slider 6 creates a pressure wave front that tends to move into the sliding and guiding chamber, pass through the opening 7, enter the hosting chamber and then continue towards the inlet 10*a*. This is important for the effectiveness of the operation that will be explained below.

For the rest, the extinguishing chamber CI has a configuration known per se, with a stack of parallel laminae over which an electric arc is conveyed which is captured by the divergent conduit 10. The latter is defined by a pair of conductors 11*a* and 11*b* divergent from the inlet 10*a* towards the lamellae stack.

Figure 5:
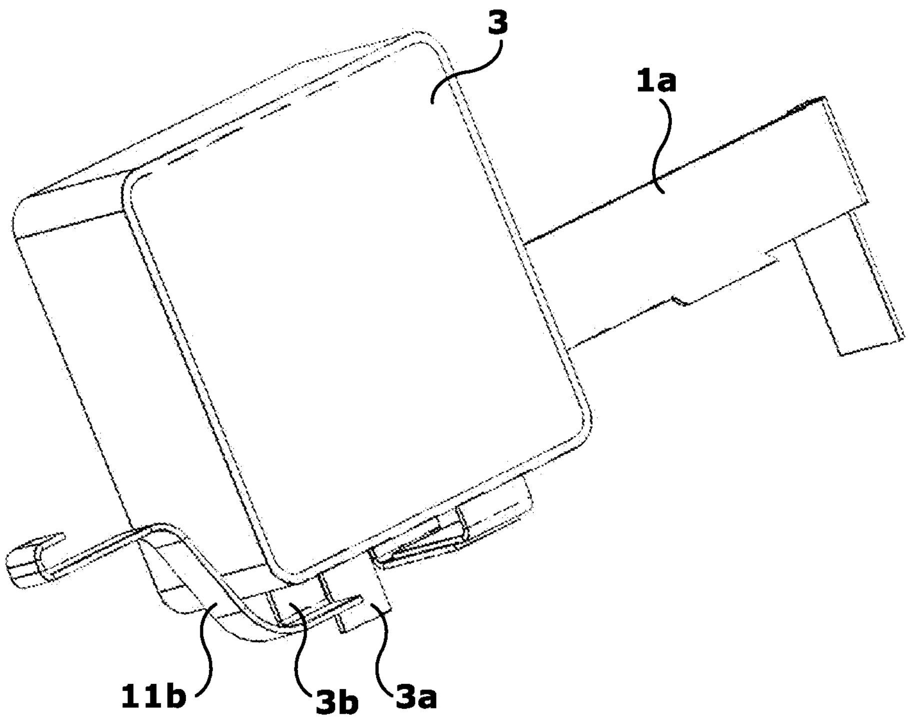
FIG. 5 is a perspective view of only the varistor from FIG. 4, seen from the opposite side.

In the preferred design illustrated in the figures, a first divergent conductor 11*a* extends from the inlet 10*a* to near a side of the lamellae stack, where it is placed in electrical contact with the extension conductor 5 connected to the earth terminal 2. A second divergent conductor 11*b* is electrically fixed, at one end, to a second electrical contact 3*b* of the varistor protection electrode (see FIG. 5) and terminates, with the other end, near the other side of the lamellae stack of the extinguishing chamber ci.

The first 3*a* and the second 3*b* electrical contacts of the varistor protection electrode 3 are shown as separate in the preferred embodiment, but technically could also be coincident in the same element.

The first 3*a* and second 3*b* electrical contacts of the varistor protection electrode 3 are at the same potential. However, in the normal operation of the arrester—as will be discussed further below—the first electrical contact 3*a* is active, while the second electrical contact 3*b* is isolated, because the electrical separation provided in the inlet 10*a* interrupts the current circuit.

As is clearly shown in the figures, the two divergent conductors 11*a* and 11*b* are in the form of conductive lamellae defining a funnel surface adjacent to the lamellae stack. This configuration is suitable for naturally conveying an electric arc that is formed at the inlet 10*a* of the extinguishing chamber towards the stack of lamellae where the arc is deionized and extinguished. The two divergent conductors 11*a* and 11*b* are independently mounted on the body of the housing C, by suitable engagement in ribs and abutment elements. Between the two divergent conductors 11*a* and 11*b*, the installation of thin sheets of insulating material can be provided, to ensure effective electrical insulation if a magnetic plate is provided.

As is clearly shown in FIG. 2B, the inlet 10*a* of the divergent conduit 10 extends for a short distance by end portions of the two divergent conductors 11*a* and 11*b*. These two end portions are arranged parallel at a distance of about 2 mm, so as to establish sufficient insulation but capture between them the electric arc that is then conveyed into the extinguishing chamber.

According to the preferred embodiment shown, the divergent conductor 11*b* is joined to the second electrical contact 3*b* of the protection electrode, which is located next to the first electrical contact 3*a*.

With this configuration, as clearly highlighted in the figures, the inlet section 10*a* of the convergent conduit 10 is arranged between the varistor 3 and the guiding and sliding chamber of the slider 6, near the electrical contact 3*a* of the varistor protection electrode, thus exploiting the space that would not be used for the presence of the electrical contact 3*a*. This positioning determines a certain integration of the extinguishing chamber CI in the components of the disconnector, helping to reduce the overall length of the housing C.

It should be noted that, according to the invention, the opening of the inlet 10*a* is placed in fluidic communication—and preferably close to—the opening 7 which puts the hosting chamber of the electrical contact 3*a* in fluidic communication with the guiding and sliding chamber of the slider 6. This characteristic feature of the invention causes the movement of the slider 6, triggered at the time of the failure of the lamina 4, to actively push the plasma and the electric arc, which develops upon opening of the circuit, inside the inlet 10*a* of the extinguishing chamber CI.

That is to say, in the arrester according to the invention, the disconnector slider 6 is advantageously used to quickly push the arc into the extinguishing chamber CI—without the need to use other mobile contacts, as provided for in some solutions of the prior art—making the extinguishing intervention very fast and effective.

The exemplary operation of the arrester is in fact as follows.

In a normal condition, the varistor discharges the voltage peaks received on the terminal 1 towards ground, passing the steep current transients through the electrical contact 3*a*, the lamina 4, the extension conductor 5 and the terminal 2. The second electrical contact 3*b* is inactive and does not perform any function.

When a relevant short circuit occurs that leads an important current to pass through the first electrical contact 3*a*, the heat developed produces the sublimation of the lamina 4 and hence opening of the primary circuit. An electric arc is thus produced between the first electrical contact 3*a* and the remaining base portion of the lamina 4. The slider 6 is released and pushed by the spring 8, moving and serving to intercept the electric arc: at the same time, the slider 6 acts as a plunger and creates a pressure wave front that pushes the plasma from the guiding and sliding chamber, through the opening 7 and toward the inlet 10*a* of the extinguishing chamber CI. The electric arc is then easily conveyed on the two conductors of inlet 10*a* and then conveyed into the divergent conduit 10 and extinguished in the stack of laminae of the extinguishing chamber.

This type of intervention has proved to be extremely effective in rapidly extinguishing the electric arc, even when the current intensities are greater than tens of kA, thus preventing high temperatures and pressures from developing inside the housing C.

As is well understood from the above description, the configuration of the invention is extremely effective for the safe extinguishing of the electric arc by the disconnector apparatus, even in the presence of high short-circuit currents, which in turn develop an amount of conductive plasma resulting from the sublimation of the conductive lamina.

The fact that the inlet section 10*a* of the divergent conduit 10 is arranged between the slider guiding and sliding chamber and the housing chamber the of electrical contact 3*a*, achieves a certain integration between components, reducing the impact of the extinguishing chamber on the overall size of the device.

Furthermore, the presence of the movable slider 6 allows a pressure wave front to be determined that effectively pushes the electric arc inside the extinguishing chamber without the need to resort to mobile contacts.

It is understood, however, that the invention is not to be considered as limited by the particular arrangement illustrated above, which represents a purely exemplary embodiment of the same, but that a range of variants is possible, whether internal or external to the arrester, all of which are within the knowledge of a person skilled in the art, without departing from the scope of protection of the invention itself, as defined by the following claims.

For example, the device described above is sized to be compliant with any overcurrent limiters necessary in the event that the prospective short-circuit current (Isc) of the power distribution system is greater than the self-extinguishing follow current (Ifi) of the disconnection device of the arrester but this is not compulsory.

In addition, the disconnection device (disconnector) as described above can also be placed in a dedicated housing and used as a stand-alone short-circuit breaking device.

The invention claimed is:

1. A surge arrester, comprising:

a first and a second electric terminal (1, 2) for connection to live and guard/neutral conductors of an electric system, between which a protection member (3) is connected, provided with a voltage electrode and with a protective electrode equipped with respective electrical connectors (1*a*, 3*a*) electrically connected to said first and second electric terminals (1, 2), a disconnector electrically arranged between said protection member (3) and said second electric terminal (2) comprising a metal lamina (4) that sublimates in the presence of short-circuit currents exceeding a preset threshold, said sublimation generating a plasma, and an intercepting slider (6), mounted elastically biased and sliding in a sliding and guiding chamber crossed by said metal lamina (4), displacement of said intercepting slider (6) being prevented by said metal lamina (4), and being allowed to be displaced by the sublimation of said metal lamina (4), and further comprising an arc extinguishing chamber (CI) provided with a divergent duct (10) and a respective inlet portion (10*a*) defined by end portions of a pair of divergent conductors (11*a*, 11*b*), characterised in that said inlet portion (10*a*) is arranged in fluidic communication with said sliding and guiding chamber and has an opening facing a pressure wave front generated by said displacement of the intercepting slider (6) acting as a plunger.

2. The surge arrester as in claim 1, characterised in that said protective electrode has a first electric contact and a second electric contact arranged in a respective hosting chamber of the protection device (3), and wherein said metal lamina (4) is joined to said first electric contact and runs through an opening (7) between the hosting chamber of the protection device (3) and said sliding and guiding chamber.

3. The surge arrester as in claim 2, characterised in that said extinguishing chamber (CI) comprises a divergent conductor (11*b*) electrically connected to said second electric contact at a same electric potential of said first electric contact.

4. The surge arrester as in claim 3, characterised in that said first and second electric contacts are distinct and arranged adjacent to each other, and said opening of the inlet portion (10*a*) is arranged in the proximity of said first electric contact.

* * * * *